(12) United States Patent
Park

(10) Patent No.: US 10,228,235 B2
(45) Date of Patent: Mar. 12, 2019

(54) DEVICE FOR MEASURING GAP AND STEP FOR VEHICLE, AND SYSTEM FOR MEASURING GAP AND STEP INCLUDING THE SAME

(71) Applicants: HYUNDAI MOTOR COMPANY, Seoul (KR); KIA MOTORS CORPORATION, Seoul (KR)

(72) Inventor: Sangkyu Park, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/631,971

(22) Filed: Jun. 23, 2017

(65) Prior Publication Data

US 2018/0164091 A1 Jun. 14, 2018

(30) Foreign Application Priority Data

Dec. 14, 2016 (KR) .................. 10-2016-0170793

(51) Int. Cl.
| | |
|---|---|
| *G01B 11/02* | (2006.01) |
| *G01B 11/14* | (2006.01) |
| *G01B 7/14* | (2006.01) |
| *G01B 7/31* | (2006.01) |
| *B62D 65/00* | (2006.01) |
| *G01J 1/42* | (2006.01) |
| *G01B 9/02* | (2006.01) |
| *H01S 3/0933* | (2006.01) |

(52) U.S. Cl.
CPC ............ *G01B 11/028* (2013.01); *B62D 65/00* (2013.01); *B62D 65/005* (2013.01); *G01B 7/14* (2013.01); *G01B 7/31* (2013.01); *G01B 9/02* (2013.01); *G01B 11/02* (2013.01); *G01B 11/14* (2013.01); *G01J 1/42* (2013.01); *H01S 3/0933* (2013.01)

(58) Field of Classification Search
CPC ... B62D 65/005; Y10S 901/47; G01B 11/028; G01B 7/14; G01B 7/31; G01B 11/14
See application file for complete search history.

(56) References Cited

U.S. PATENT DOCUMENTS

| | | | | |
|---|---|---|---|---|
| 4,666,303 | A * | 5/1987 | Pryor | ...................... G01B 11/14 356/606 |
| 5,999,265 | A * | 12/1999 | Dalancon | ............... G01B 11/14 250/559.24 |

(Continued)

*Primary Examiner* — Maurice Smith
(74) *Attorney, Agent, or Firm* — Knobbe Martens Olson & Bear LLP

(57) ABSTRACT

A device for measuring a gap and a step between two panels is disclosed. The device includes a laser radiating unit for emitting laser beam over a first panel and a second panel and in a first linear pattern across a gap between a first panel and a second panel. The device further includes a lighting unit for emitting a non-laser light beam over a first panel and a second panel and in a second linear pattern overlapping the first pattern across the gap between the first and the second panel. The system further comprises a camera for capturing images of the first linear pattern of laser and the second linear pattern of non-laser light projected over the first panel and the second panel. The system analyzes at least one image captured from the camera and estimates a width of the gap between the first and second panels.

9 Claims, 6 Drawing Sheets

(56) References Cited

U.S. PATENT DOCUMENTS

| | | | | |
|---|---|---|---|---|
| 8,437,535 | B2* | 5/2013 | Boca | G01S 17/875 |
| | | | | 382/154 |
| 2011/0298916 | A1* | 12/2011 | Arden | H04N 7/18 |
| | | | | 348/86 |
| 2014/0001997 | A1* | 1/2014 | Kim | H02K 11/001 |
| | | | | 318/490 |
| 2014/0294243 | A1* | 10/2014 | Park | G01B 11/14 |
| | | | | 382/106 |
| 2014/0297036 | A1* | 10/2014 | Park | B25J 9/1694 |
| | | | | 700/258 |
| 2015/0266183 | A1* | 9/2015 | Alifragkis | B25J 9/1692 |
| | | | | 700/254 |
| 2016/0253562 | A1* | 9/2016 | Yuki | G06T 7/73 |
| | | | | 382/153 |

* cited by examiner

DEVICE FOR MEASURING GAP AND STEP FOR VEHICLE, AND SYSTEM FOR MEASURING GAP AND STEP INCLUDING THE SAME

CROSS-REFERENCE TO RELATED APPLICATION

This application claims priority to and the benefit of Korean Patent Application No. 10-2016-0170793 filed in the Korean Intellectual Property Office on Dec. 14, 2016, the entire contents of which are incorporated herein by reference.

BACKGROUND

Field

The present disclosure relates to a device for measuring a gap and a step for a vehicle, which accurately measures a gap and a step between panels in a vehicle body, in which a roof, a hood, doors, and a trunk lid are completely assembled, and a system for measuring a gap and a step including the same.

Description of the Related Art

In general, various panels, such as a roof, a hood, doors, and a trunk lid, are attached to a vehicle body of a vehicle to form an exterior appearance of the vehicle body.

Here, each panel attached to the vehicle body needs to be mounted so as not to generate a gap or a step with an adjacent panel or the vehicle body, and to this end, in the related art, an operator examines and confirms mounting states of various panels through a gauge, or only with the eyes.

As described above, the manual operation examination and the visual examination method through the gauge by the operator depend on a quality and performance determination reference and an operation method of the operator, so that it is impossible to accurately examine whether the various panels are accurately mounted or are erroneously mounted, thereby degrading reliability and making uniform quality management of the vehicle body be difficult.

In order to prevent the problem, recently, an automatic gap and step measuring system for a vehicle by a method of measuring a gap and a step between a vehicle body and various panels by using a robot mounted with a camera or a sensor has been applied.

Accordingly, research on a gap and step measuring system for a vehicle for more accurately and automatically measuring a gap and a step between panels and improving productivity and a quality has been actively conducted.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

The present disclosure has been made in an effort to provide a device for measuring a gap and a step for a vehicle, which more accurately and automatically measures a gap and a step between panels to improve productivity and a quality, and a system for measuring a gap and a step including the same. An embodiment of the present invention provides a device for measuring a gap and a step, including: a laser radiating unit disposed so as to radiate at least one straight laser to first and second panels and a gap formed between the first and second panels; a light radiating unit configured to radiate light overlapping the straight laser radiated from the laser radiating unit; and a camera disposed so as to detect the laser and the light, which are radiated to the first and second panels and the gap formed between the first and second panels by the laser radiating unit and the light radiating unit.

The light radiating unit may include a light emitting diode (LED) as a light source.

Each of the first and second panels may be formed outside a vehicle body.

Another embodiment of the present invention provides a system for measuring a gap and a step, including: the device for measuring the gap and the step according to the embodiment of the present invention; a robot, in which the device for measuring the gap and the step is installed in a front end of an arm; and a controller configured to control the robot to radiate laser and light along the gap between the first and second panels.

The system may further include a rotation module, which varies radiation angles of the laser and the light radiated by the device for measuring the gap and the step.

The rotation module may include: a body, in which the device for measuring the gap and the step is installed and fixed, and which is disposed so as to be rotatable based on a rotation center part; a rotation arm connected to one side of the body; and a driver, which pulls or pushes the rotation arm to enable the body to be rotated based on the rotation center part, and adjusts a radiation angle of the laser or the light radiated from the laser radiating unit and the light radiating unit.

The system may further include a controller, which analyzes an image detected by the camera, and extracts shapes of the first and second panels and characteristics of the gap and the step formed between the first and second panels.

The controller may calculate the gap and the step formed between the first and second panels in numerical values.

The controller may calculate the first and second panels, and the gap and the step formed between the first and second panels in shapes.

The system may further include a display device, which displays the shapes of the first and second panels, and the gap and the step formed between the first and second panels calculated by the controller.

The controller may radiate the laser and the light to the first and second panels and a set area, in which the gap is formed, and correct a position characteristic of an arm of the robot so that a direction, in which the gap is formed, and a direction, in which the laser or the light is formed, have a predetermined angle.

The driver may include: a motor that is a rotation force source; a pinion gear connected with an output axis of the motor; a rod, in which a rack gear circumscribing with the pinion gear is formed; and a pin, which is fixed to one side of the rod, and passes through an end portion of the rotation arm.

The rotation arm may be formed with a slot, through which the pin passes through, and which is formed in a longitudinal direction of the rotation arm.

The system may further include: a return elastic member, which is disposed at a rear side of the rod so as to elastically support a rear end of the rod; and a tension adjusting cap, which is disposed so as to adjust compression force of the elastic member.

The pinion gear may be formed only in an area set in a rotation direction.

The controller may receive shape data including the first and second panels, and control the robot according to the shape data to move the device for measuring the gap and the step along the gap between the first and second panels.

Yet another embodiment of the present invention provides a method of measuring a gap and a step, including: radiating straight light in a direction vertical to a gap between first and second panels, and radiating straight laser so as to overlap the light; detecting a portion, to which the laser and the light are radiated; and calculating a gap and a step between the first and second panels by using detected data.

The method may further include rotating the straight laser and the light based on a set rotation center, and performing scanning in a direction, in which the gap is formed.

Each of the first and second panels may be one of a door, a hood, and a trunk lid of a vehicle body, and the method may further include: moving the vehicle body to a set position; and aligning the door, the hood, and the trunk lid mounted to the vehicle body at set positions.

DETAILED DESCRIPTION OF EMBODIMENTS

Figure 1:
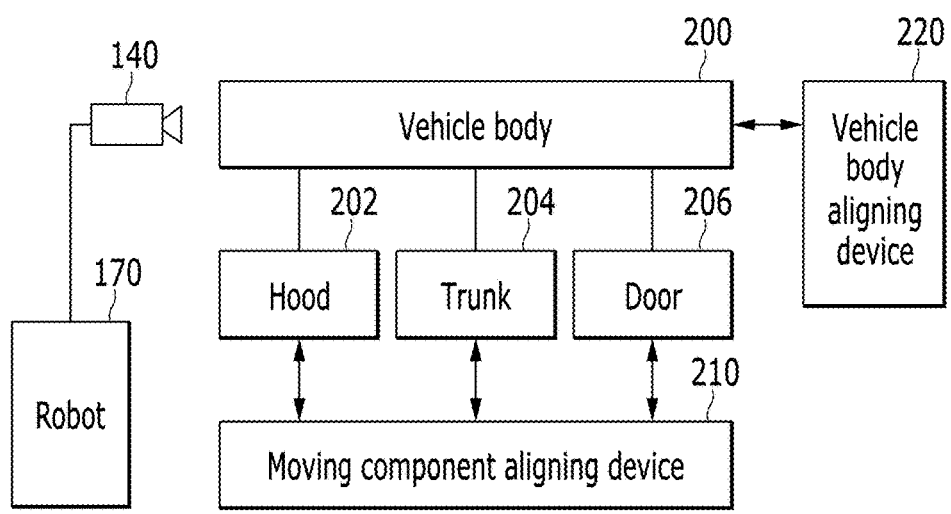
FIG. 1 is a schematic diagram illustrating a vehicle body aligning device according to an embodiment of the present invention.

Hereinafter, embodiments of the present invention will be described in detail with reference to the accompanying drawings.

An aspect of the invention provides a system for arranging two panels in a vehicle manufacturing process. When a first panel 151 and a second panel 152 are arranged to be assemble to a vehicle body, the system operates at least one robotic arm 170, using signals from controller 100, to place a gap sensing device 140 over the first and second panels. At least one light source 125, 127 projects at least one liner pattern over the first and second panels 150, 151, 152.

Then, the system captures an image of the projected line pattern and analyzes the image to calculate an angle indicating difference of orientations of the gap and the projected line pattern. In embodiments, refereeing to FIG. 3, a camera 130 captures a first image showing the gap and the projected pattern 161. The controller 100 analyze the first image to determine a first orientation of the gap (an orientation of the gap's imaginary center line along which the gap generally extends) and a second orientation of the projected pattern on the first and the second panels 150 (an orientation of the projected pattern 161 along which the pattern generally extends). Then, the controller 100 determines the angle between the pattern 161 and the gap. Subsequently, the controller 100 of the system drives at least one actuator (arm 170) to adjust the orientation difference between the pattern 161 and the gap. In embodiments, the system adjusts position, posture of the sensing device 140 such that in an image captured by the camera 130 over the two panels, the projected pattern 161 is generally perpendicular to the gap.

Subsequently, referring to FIGS. 4 and 5, the controller 100 operates the rotational module 120 to scan the projected patterns 161, 162 along the gap (from one end AA to the other end BB). During the scanning, the gap remains within the projected patterns 161, 162. Prior to scanning, the system adjusted position or posture of the sensing device 140 such that the gap remains crossing the projected patterns 161, 162 in all images captured during the scanning process.

Subsequently, the controller analyzes the images captured during the scanning process and measures the gap and the step (illustrated in FIG. 2) the two panels 150, 151, 152. Then, the controller determines that the two panels are properly arranged within a predetermined tolerance. If not, the controller communicates with another system to re-arrange at least one of the two panels.

FIG. 1 is a schematic diagram illustrating a gap step measuring system according to an embodiment of the present invention.

Referring to FIG. 1, the measuring system includes a vehicle body 200, a hood 202, a trunk lid 204, a door 206, a vehicle body aligning device 220, a moving component aligning device 210, a gap and step measuring device 140, and a robot 170 as main constituent elements.

The vehicle body 200 includes the hood 202, the trunk lid 204, and the door 206 as the moving components, and the moving component aligning device 210 fixes the hood 202, the trunk lid 204, and the door 206 at set positions.

Further, the vehicle body aligning device 220 aligns the vehicle body 200 at a set position, the gap and step measuring device 140 is disposed at a front end of an arm of the robot 170, the gap and step measuring device 140 is moved along a gap formed between the hood 202, the trunk lid 204, and the door 206 in the vehicle body 200 by controlling the robot 170, and the gap and step measuring device 140 radiates laser and light and measures a gap and a step formed between panels.

Figure 2:
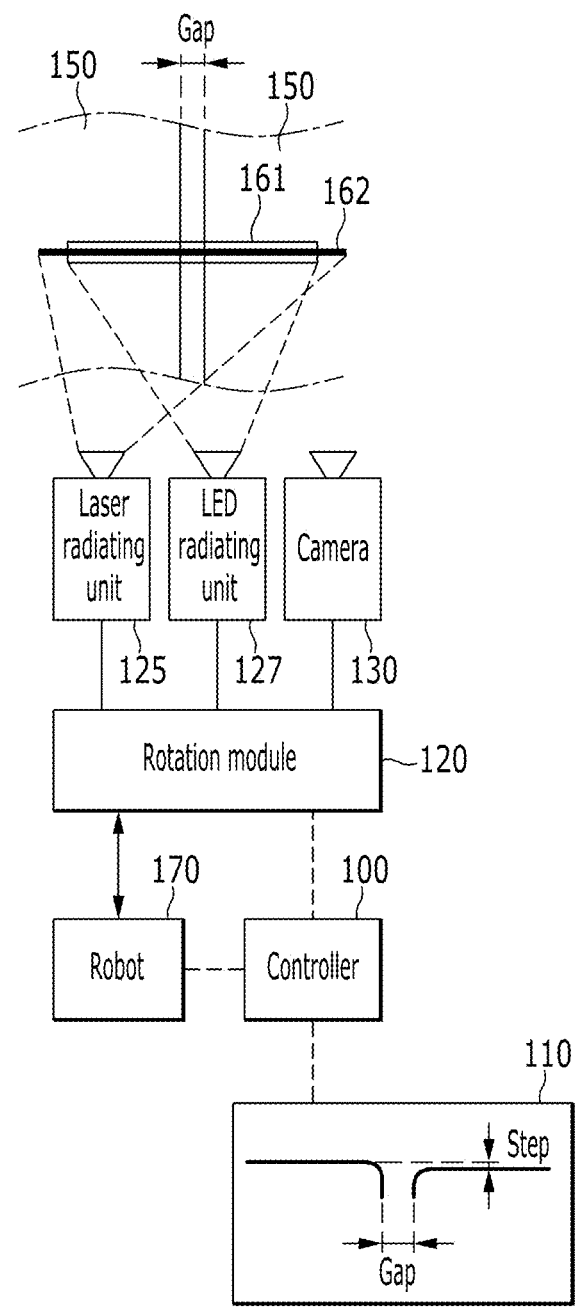
FIG. 2 is a schematic diagram illustrating a gap and step measuring system according to an embodiment of the present invention.

FIG. 2 is a schematic diagram illustrating a gap and step measuring system according to an embodiment of the present invention Referring to FIG. 2, the gap and step measuring system includes first and second panels 150, a laser radiating unit 125, an LED radiating unit 127, a camera 130, a rotation module 120, a robot 170, a controller 100, and a display 110 as main constituent elements.

The laser radiating unit 125 radiates straight laser to the first and second panels 150 and a gap in a direction vertical to the gap between the first and second panels 150, and the LED radiating unit 127 radiates straight light so as to overlap the straight laser. Herein, the straight laser may overlap a center in a longitudinal direction of a straight beam.

The camera 130 photographs a portion, to which the laser and the light are radiated, and transmits photographed data to the controller 100. The controller 100 calculates forms and numerical values of the gap and a step between the first and second panels 150 by using the received data.

The display 110 forms shape data calculated by the controller 100 on a screen, and enables an operator to confirm the numerical values of the gap and the step.

The rotation module 120 rotates the laser radiating unit 125, the LED radiating unit 127, and the camera 130 within predetermined angle ranges, to make laser and light be radiated along the gap.

Accordingly, the controller 100 may control the robot 170 to move the gap and step measuring device 140 along a route set according to the shape data of the vehicle body.

Further, the controller 100 receives the shape data of the vehicle, controls the robot 170, the gap and step measuring device 140, the controller 100, and the display 110, and the controller 100 may be implemented with one or more microprocessors operated by a set program, and the set program may include a series of commands for performing a method according to an embodiment of the present invention to be described below.

Figure 3:
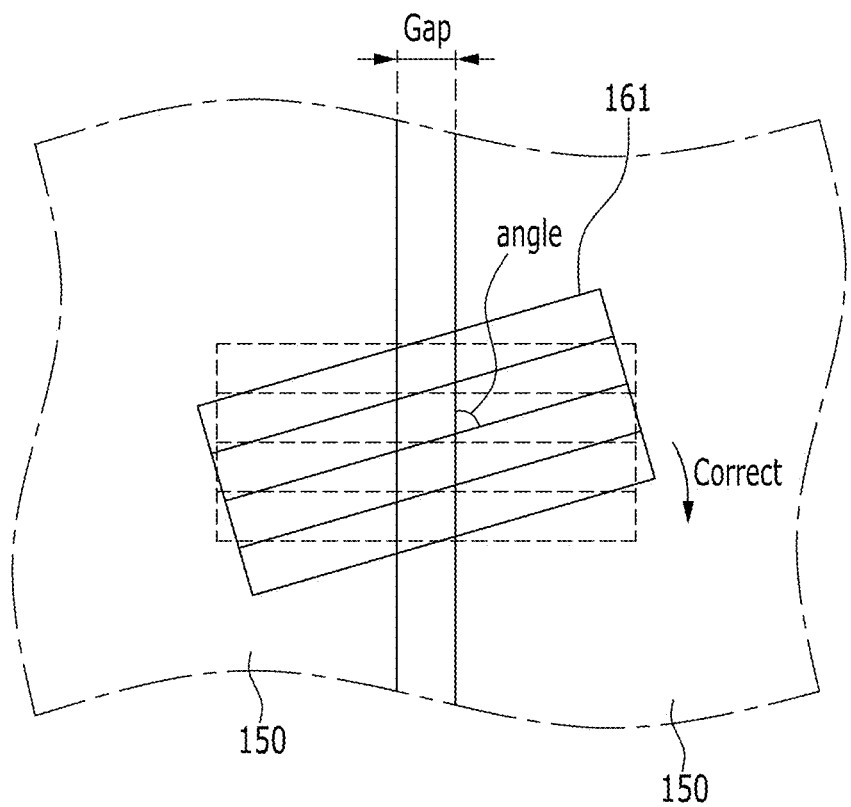
FIG. 3 is a partial top plan view illustrating a method of radiating laser and light and correcting a position of a gap and step measuring device in the gap and step measuring system according to the embodiment of the present invention.

FIG. 3 is a partial top plan view illustrating a method of irradiating laser and light and correcting a position of the gap and step measuring device in the gap and step measuring system according to the embodiment of the present invention.

Referring to FIG. 3, when a gap and a step are formed between the first and second panels 150, and the laser radiating unit 125 and the LED radiating unit 127 radiate straight laser and light, the camera 130 photographs the radiated laser and light, and the controller 100 calculates an angle formed between the straight laser and the gap. Then, the robot 170 is controlled so that the angle is 90° to correct a posture of the gap and step measuring device 140.

Figure 4:
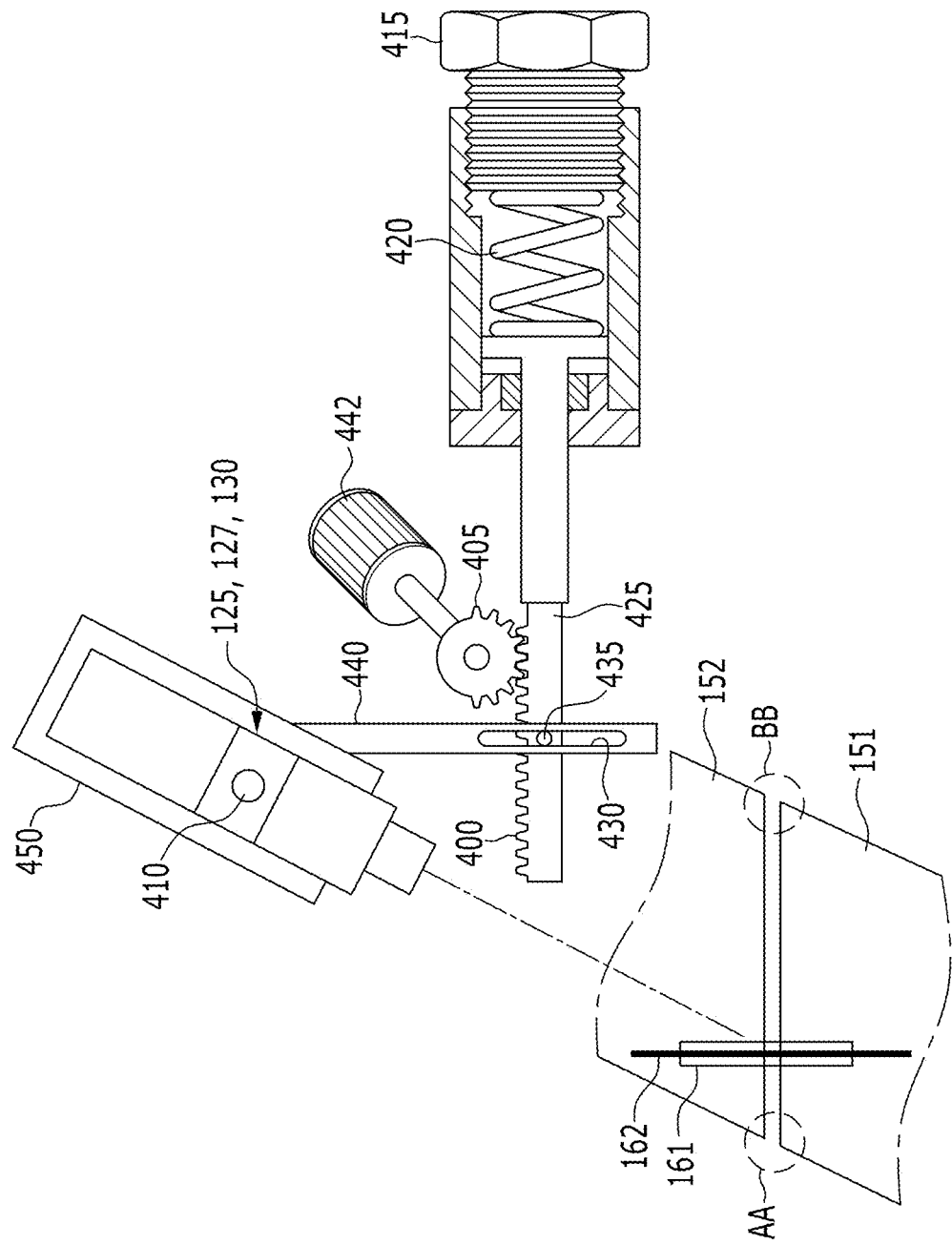
FIGS. 4 and 5 are schematic diagrams illustrating a rotation module in the gap and step measuring system according to the embodiment of the present invention.
Figure 5:
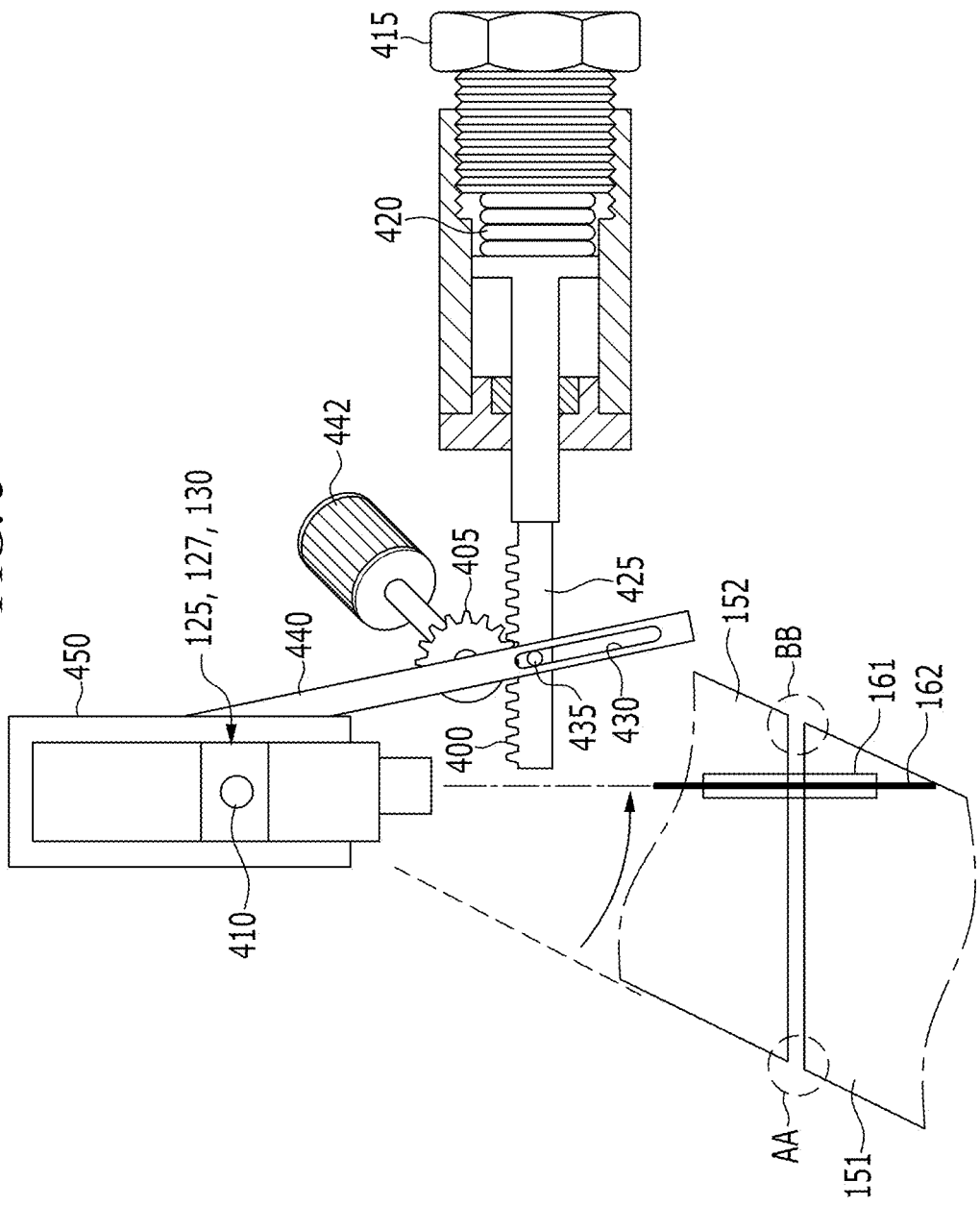

FIGS. 4 and 5 are schematic diagram illustrating a rotation module in the gap and step measuring system according to the embodiment of the present invention.

Referring to FIGS. 4 and 5, the gap and step measuring system includes a body 450, a rotation center pin 410, the laser radiating unit 125, the LED radiating unit 127, the camera 130, a rotation arm 440, a slot 430, a pin 435, a rod 425, a rack gear 400, a pinion gear 405, a motor 442, a return elastic member 420, and a tension adjusting cap 415 as main constituent elements.

The laser radiating unit 125, the LED radiating unit 127, and the camera 130 are disposed in the body 450, and the radiating units radiate laser and LED light to the gap between the first and second panels 150, respectively, and the camera 130 is disposed so as to photograph the gap and the radiated laser and LED light.

The body 450 is disposed so as to be rotatable based on the rotation center pin 410, and the rotation arm 440 is connected to one side of a lower portion of the body 450 and is extended in a downward direction.

The slot 430 is formed at a lower end portion of the rotation arm 440 in a longitudinal direction, and the pin 435 is disposed through the slot 430. The pin 435 is fixed to one surface of the rod 425.

The rack gear 400 is formed in the rod 425 in a longitudinal direction within a set range, and the pinion gear 405 is circumscribed to the rack gear 400. The pinion gear 405 is formed within a set angle range of the rotation gear, and the pinion gear 405 is normally rotated or counter-rotated by the motor 442.

In the embodiment of the present invention, when the motor 442 rotates, so that the pinion gear 405 rotates, the rod 425 reciprocates, the pin 435 fixed to the rod 425 pushes or pulls a lower end portion of the rotation arm 440 through the slot 430 to enable the body 450 to reciprocate within a set angle range based on the rotation center pin 410.

The return elastic member 420 may elastically support the rod 425 in a front direction, and may repeatedly return the rod 425 in the front direction while repeating compression and elongation. Further, the tension adjusting cap 415 is disposed at a rear side of the return elastic member 420, and the tension adjusting cap 415 is screw-engaged with a housing, and tension of the return elastic member 420 may be controlled by normally rotating or counter-rotating the tension adjusting cap 415.

In the embodiment of the present invention, when the pinion gear 405 is formed within a predetermined angle range in a rotation direction, and the motor 442 is rotated in a predetermined direction, the pinion gear 405 may allow the rod 425 to reciprocate in the front and rear directions through the rack gear 400.

In the embodiment of the present invention, for convenience of the description, the term of the first and second panels 150 is used, and the first and second panels 150 may refer to the components disposed in the vehicle body while having a gap. For example, the first panel may be an outer panel of the door, and the second panel may be an outer panel of the vehicle body disposed while having a gap with the door.

Figure 6:
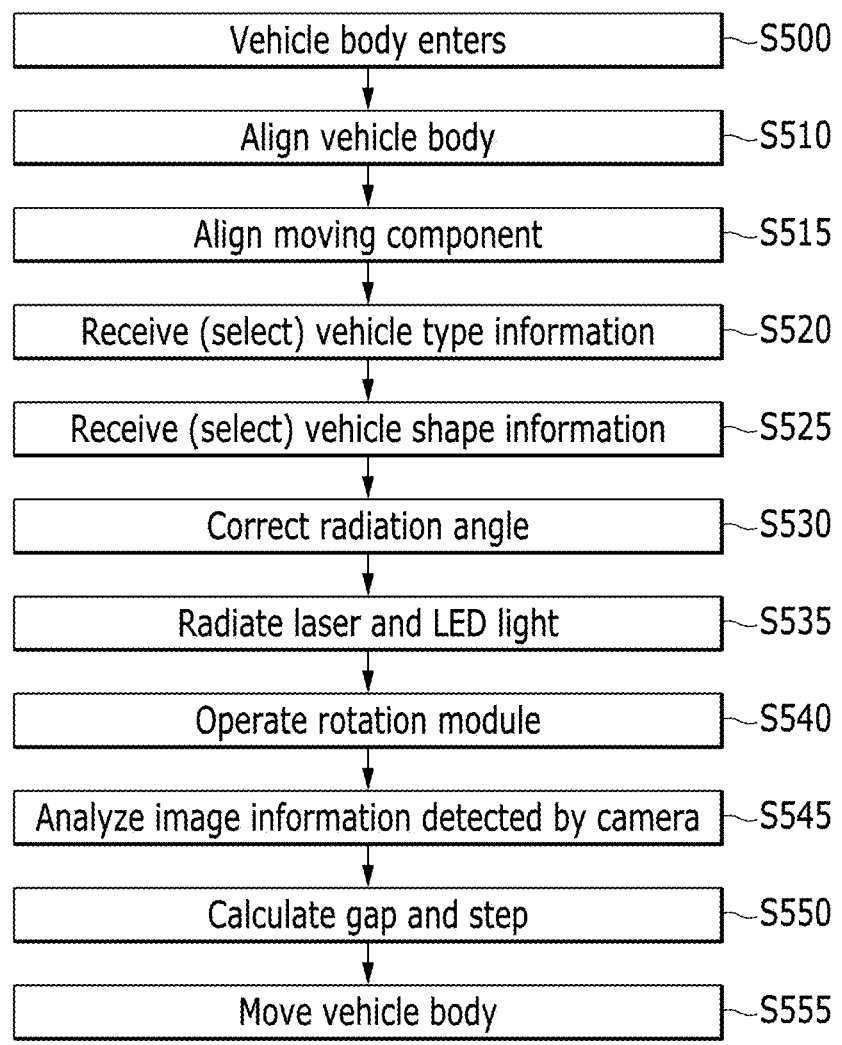
FIG. 6 is a general flow chart illustrating a gap and step measuring method according to an embodiment of the present invention.

FIG. 6 is a general flow chart illustrating a gap and step measuring method according to an embodiment of the present invention.

Referring to FIG. 6, the vehicle body enters a set position in operation S500, and the vehicle body aligning device 220 aligns the vehicle body 200 in operation S510. In operation S515, the moving components mounted in the vehicle body 200 are aligned. Herein, the moving components may include the door 206, the hood 202, and the trunk lid 204.

The controller 100 receives or selects vehicle type information in operation S520, and receives or selects shape information about the vehicle type information in operation S525.

In operation S530, the controller 100 radiates laser and LED light to the first and second panels 150 of the vehicle body by controlling the robot 170 and the gap step measuring device 140, and corrects radiation angles.

The controller 100 radiate laser and LED light along a gap by controlling the robot 170 and the gap step measuring device 140 in operation S535, and the controller 100 scans shapes of the first and second panels 150 along the gap by using the laser and the LED light by operating the rotation module 120 in operation S540.

Image information photographed by the camera 130 is analyzed in operation S545, and shape information is calculated by using the image information and a gap and a step are calculated from the shape information in operation S550.

Further, in operation S555, when all of the shape information, the gap, and the step are detected, the vehicle body 200 is moved to the outside and the control is terminated.

The illustrative logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As described above, according to the embodiment of the present invention, laser and LED lighting are radiated while overlapping and the hybrid light is continuously radiated to a portion, in which a gap and a step are formed, thereby more accurately detecting the panels and a gap and a step formed between the panels.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A system for measuring a gap and a step, comprising:
a device for measuring the gap and the step, the device comprising:
   a laser radiating unit disposed so as to radiate at least one straight laser to first and second panels and the gap formed between the first and second panels,
   a light radiating unit configured to radiate light overlapping the straight laser radiated from the laser radiating unit, and
   a camera disposed so as to detect the laser and the light, which are radiated to the first and second panels and the gap formed between the first and second panels by the laser radiating unit and the light radiating unit;
a robot, in which the device for measuring the gap and the step is installed in a front end of an arm of the robot;
a controller configured to control the robot to radiate laser and light along the gap between the first and second panels; and
a rotation module, which is configured to vary radiation angles of the laser and the light radiated by the device for measuring the gap and the step,
wherein the rotation module comprises:
   a body, in which the device for measuring the gap and the step is installed and fixed, and which is disposed so as to be rotatable based on a rotation center part,
   a rotation arm connected to one side of the body, and
   a driver, which is configured to pull or push the rotation arm to enable the body to be rotated based on the rotation center part, and further configured to adjust a radiation angle of the laser or the light radiated from the laser radiating unit and the light radiating unit,
wherein the driver comprises:
   a motor that is a rotation force source,
   a pinion gear connected with an output axis of the motor,
   a rod, in which a rack gear circumscribing with the pinion gear is formed, and
   a pin, which is fixed to one side of the rod, and passes through an end portion of the rotation arm.

2. The system of claim 1, further comprising:
the controller, which is configured to analyze an image detected by the camera, and further configured to extract shapes of the first and second panels and characteristics of the gap and the step formed between the first and second panels.

3. The system of claim 2, wherein:
the controller is configured to calculate the gap and the step formed between the first and second panels in numerical values.

4. The system of claim 1, further comprising:
a display device, which is configured to display the shapes of the first and second panels, and the gap and the step formed between the first and second panels.

5. The system of claim 1, wherein:
the controller is configured to cause radiation of the laser and the light to the first and second panels and a set area, in which the gap is formed, and further configured to correct a position characteristic of the arm of the robot so that a direction, in which the gap is formed, and a direction, in which the laser or the light is formed, have a predetermined angle.

6. The system of claim 1, wherein:
the rotation arm is formed with a slot, through which a pin passes through and which is formed in a longitudinal direction of the rotation arm.

7. The system of claim 1, further comprising:
a return elastic member, which is disposed at a rear side of the rod so as to elastically support a rear end of the rod; and
a tension adjusting cap, which is disposed so as to adjust compression force of the elastic member.

8. The system of claim 1, wherein:
the pinion gear is formed only in an area set in a rotation direction.

9. The system of claim 1, wherein:
the controller is configured to receive shape data including the first and second panels, and is configured to control the robot according to the shape data to move the device for measuring the gap and the step along the gap between the first and second panels.

* * * * *